United States Patent [19]

Schwartz

[11] Patent Number: 5,607,356

[45] Date of Patent: Mar. 4, 1997

[54] INTERACTIVE GAME FILM

[75] Inventor: David M. Schwartz, San Carlos, Calif.

[73] Assignee: Atari Corporation, Sunnyvale, Calif.

[21] Appl. No.: 438,281

[22] Filed: May 10, 1995

[51] Int. Cl.⁶ ........................................................ A63F 9/22
[52] U.S. Cl. .................. 463/31; 463/43; 395/173
[58] Field of Search ....................... 273/434, 437,
 273/DIG. 28; 364/410; 395/152, 250; 434/327,
 335; 463/23, 30, 31, 43

[56] References Cited

U.S. PATENT DOCUMENTS

| | | |
|---|---|---|
| Re. 33,662 | 8/1991 | Blair et al. . |
| 4,305,131 | 12/1981 | Best ............................................ 273/434 |
| 4,475,132 | 10/1984 | Rodesch ........................... 273/DIG. 28 |
| 4,695,953 | 9/1987 | Blair et al. . |
| 4,991,011 | 2/1991 | Johnson et al. . |
| 5,161,034 | 11/1992 | Klappert . |
| 5,219,291 | 6/1993 | Fong et al. ............................... 434/327 |
| 5,331,417 | 7/1994 | Soohoo . |
| 5,358,259 | 10/1994 | Best ........................................ 273/434 |

*Primary Examiner*—Jessica Harrison
*Assistant Examiner*—James Schaaf
*Attorney, Agent, or Firm*—Shoemaker and Mattare, Ltd.

[57] ABSTRACT

An interactive game film includes, on a video disk, data arranged in clips representing video film segments, each clip having a lead-in segment, a body segment, a loop segment, and a lead-out segment. Each clip matches at least one other, so that when the clips are played in series, the splice is seamless. The clips are displayed by a driver in response to instructions from a game control program unique to a particular game. The game control program provides an interface, in the form of visible or audible subtitles containing keywords, between a player and the driver, whereby the player can, at decision points in the game, control which film clip is displayed next.

10 Claims, 7 Drawing Sheets

DRAM ALLOCATION OF BUFFERS

| | | |
|---|---|---|
| 000000 TO 020004 | GAME CONTROL PROGRAM |
| 020004 TO 040004 | DRIVER PROGRAM |
| 040008 TO 0E1308 | LOOPING BUFFER |
| 0E1300 TO 131D0C | LEAD-OUT BUFFER |
| 131D10 TO 182710 | LEAD-OUT BUFFER |
| 182714 TO 1D3114 | LEAD-OUT BUFFER |
| 1D3118 TO 1DF518 | TEXT BUFFER |
| 1DF51C TO 1EB91C | AUDIO BUFFER |
| 1EB920 TO 1F7D20 | VOICEOVER BUFFER |
| 1F7D24 TO 1FFFFE | STACK |

HEAD SHOT

PAN RIGHT TO DOORWAY

PAN, ZOOM TO DOOR

DOOR OPENING, START TO WALK

DOOR OPENS FULLY INTO DARK ROOM

LIGHT ON IN ROOM. SEE THE BODY

GET CLOSE TO BODY

INSPECT THE HAND OF THE VICTIM

DOOR OPENS FULLY INTO DARK ROOM

LIGHT ON ENTER, TURN LEFT, SEE MAN

MAN RAISES GUN

TACKLE MAN AT ANKLES

DOOR OPENS INTO DARKENED ROOM

LIGHT ON TURN LEFT SEE WOMAN ON BED

APPROACH THE BED

WOMAN STARTS TO SIT UP

FIG. 7

INTERACTIVE GAME FILM

BACKGROUND OF THE INVENTION

This invention relates generally to video games and more particularly to an interactive game "film" which is stored on an optical disk (CDROM) and can be played on a microprocessor-based system.

A number of video games contain an animated virtual character, represented on a display screen, whose movements may be controlled by the actual player sitting before the display. The point of view of the virtual character in some instances is the same as that of the player, creating a "first person" relationship. In many simpler video games, the virtual character can be moved in any direction at any moment. In more realistic games, however, the character is constrained to follow a path from which he can vary only at certain opportunities, and even then the number of options may be limited. Greater realism, involving realistic backgrounds and correct rendering of moving objects at different depths from the viewer, places greater burdens on the computer processor, data storage device, host random access memory, and video display memory. Game designers have therefore had to compromise between the conflicting goals of extremely realistic rendering and providing the player with a sufficient number of choices to give the virtual character an entertaining degree of spontaneity.

In the following discussion, we use the term "player" to mean the person playing the game, and "protagonist" to mean the principal character or hero of the game.

In The Prisoner of Zelda, for example, the virtual protagonist, viewed always from a bird's eye point of view, can move at will in two dimensions through a palace of many rooms. The game is entertaining because of the many options the player has throughout the game; however, the rendering is cartoonish, and depth portrayal is poor.

Other games have been given better rendering, still short of realistic, at the expense of playing enjoyment. The so-called branching in some such games consists at points only of a correct choice and in incorrect one, the latter resulting in termination of the protagonist and thus the game. An example of this type of game is Dragon's Lair. The continuation of the animated story is dependent on the player's ability to make the right decision at key moments in the story. If, for example, the player fails to draw "his" sword when required, his protagonist is killed, and the game must be rerun. Since there is only one correct choice at each decision point, successful play of the game is always the same. Once such a game is played through, its appeal is greatly diminished.

Another problem with prior games which strive for representational realism is that there may be discontinuities ("seams") in the rendering, particularly when logical branching occurs. Such breaks disturb the player's illusion that he is actually participating in the action.

Part of the problem with prior games was that of storage access times. With tape-based systems, and to a lesser extent, disc-based systems, seek times from one scene to another were so great as to prevent seamless scene switching where there were logical branches. In MIT's Aspen Colorado Walking Tour, for example, one could explore the town of Aspen by selecting which way to turn at each corner. But at each decision point, motion halted while the next segment of film was cued up. There was no opportunity to buffer data to smooth the transition, since this was an analog system.

To overcome hardware limitations, some prior digital games used very large RAM buffers to store streams of data flowing from a storage device such as a CD-ROM.

Another approach was to interleave data on the storage medium. For example, where three alternative scenes were involved, every third data element would belong to one of the scenes, so that all three scenes were "present" at all times, and could be instantaneously switched between.

SUMMARY OF THE INVENTION

An object of the present invention is to provide a genuinely realistic rendering of scenery and objects in a video game, while providing smooth transitions between scenes.

Another object of the invention is to make it possible to use an affordable hardware platform that has the computing power, solid-state memory, software and CD-compatible disc drive necessary to display a realistic game "film".

The above objects are attained by an interactive game "film" including, on a video disk, data arranged in blocks representing video film segments, each block having a lead-in, a body, a loop, and a lead-out. The data is processed by an engine or driver, useful with various different games, for transferring data from the storage disk to a video display.

A game control program, unique to a particular game, provides an interface between a player and the engine, whereby the player can, at decision points in the game, control which film segment is displayed next. The game control program also provides textual and/or audio feedback to the player to inform him what actions he can take at various points during the game.

In the description below, "KB" means kilobytes, "MB" means megabytes, "RAM" means random access memory, "DRAM" means dynamic random access memory, and "CD" means compact disc.

BRIEF DESCRIPTION OF THE DRAWINGS

In the accompanying drawings.

DESCRIPTION OF THE PREFERRED EMBODIMENT

Hardware

The invention described in detail below is a game which can be played on a CD-ROM equipped personal computer or a dedicated game system such as the Atari Jaguar.

The Atari Jaguar can decompress digital video and audio from CD at NTSC resolution and VHS picture quality, at 24 frames per second for over an hour, using CinePak data compression. (If MPEG data compression is used instead, using an add-on MPEG Decoder Cartridge, running time can be increased to over 90 minutes.) At the same time, Jaguar can execute a complex game program, overlay scrolling subtitles, and respond to user input within one-sixtieth (TV field time) of a second.

If a personal computer is used, it must have an adequate processor (a 66 Mhz 80486 PC, or a PowerMac, for example) and sufficient dynamic memory to keep up with the game's data flow. Slower machines cannot manage the data at 24 full screen frames per second; however, one can compensate by reducing the size and/or resolution of the displayed picture.

Figure 1:
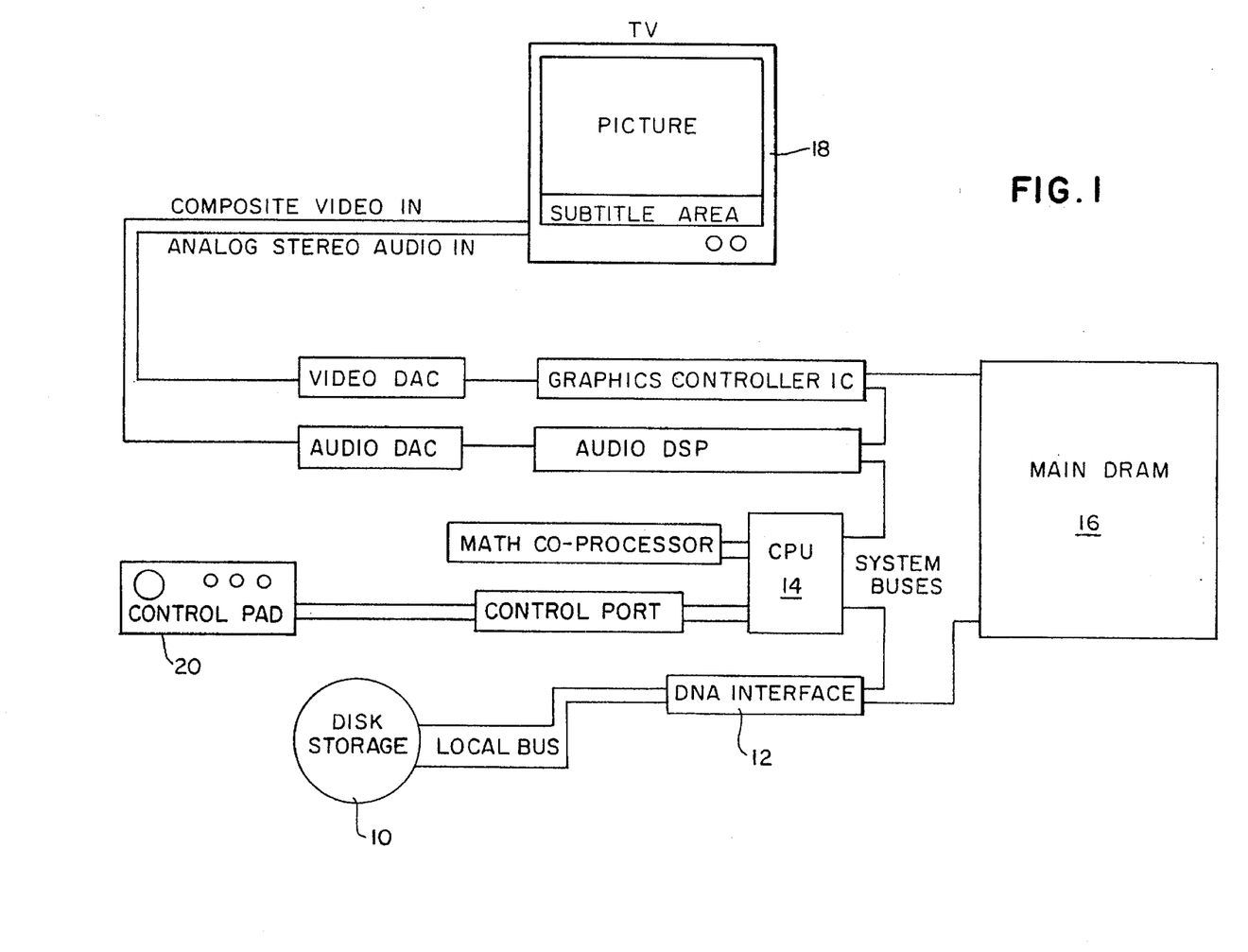
FIG. 1 is a block diagram of an interactive game system embodying the invention.

The hardware is diagramed in FIG. 1. The CD reader 10 at the bottom of the figure communicates via a DMA interface 12 with the CPU 14 and with dynamic memory 16. The CPU, operating under programming instructions previously read into memory, controls the flow of data to memory, and thence to the video screen of a television or computer monitor 18. Audio signals are directed to the TV's audio system. The CPU responds to the player's manual input on a control pad 20.

A control pad such as that used on any dedicated game machine such as the Jaguar, Sega Genesis or Super Nintendo is sufficient to provide the signal needed by the game control system. Any key, or keys, on a personal computer keyboard will function equally well for obtaining user input, as will the fire button on standard PC game joysticks. The control signal itself is solely an electrical level change edge, which, when de-bounced by hardware or software, indicates that the user has pressed a button or key. This invention requires only a single button or control key, though a specific game control program may take advantage of more keys, at the programmer's discretion.

The various components communicate through standard interfaces well known to a person of ordinary skill in the computer field.

While the presently preferred embodiment of the invention includes a CDROM as a storage medium, it should be understood that other media, including those yet to be developed, may be used in the broad context of this invention. For example, users could play on networks from a common data source.

On-disc Software

Figure 2:
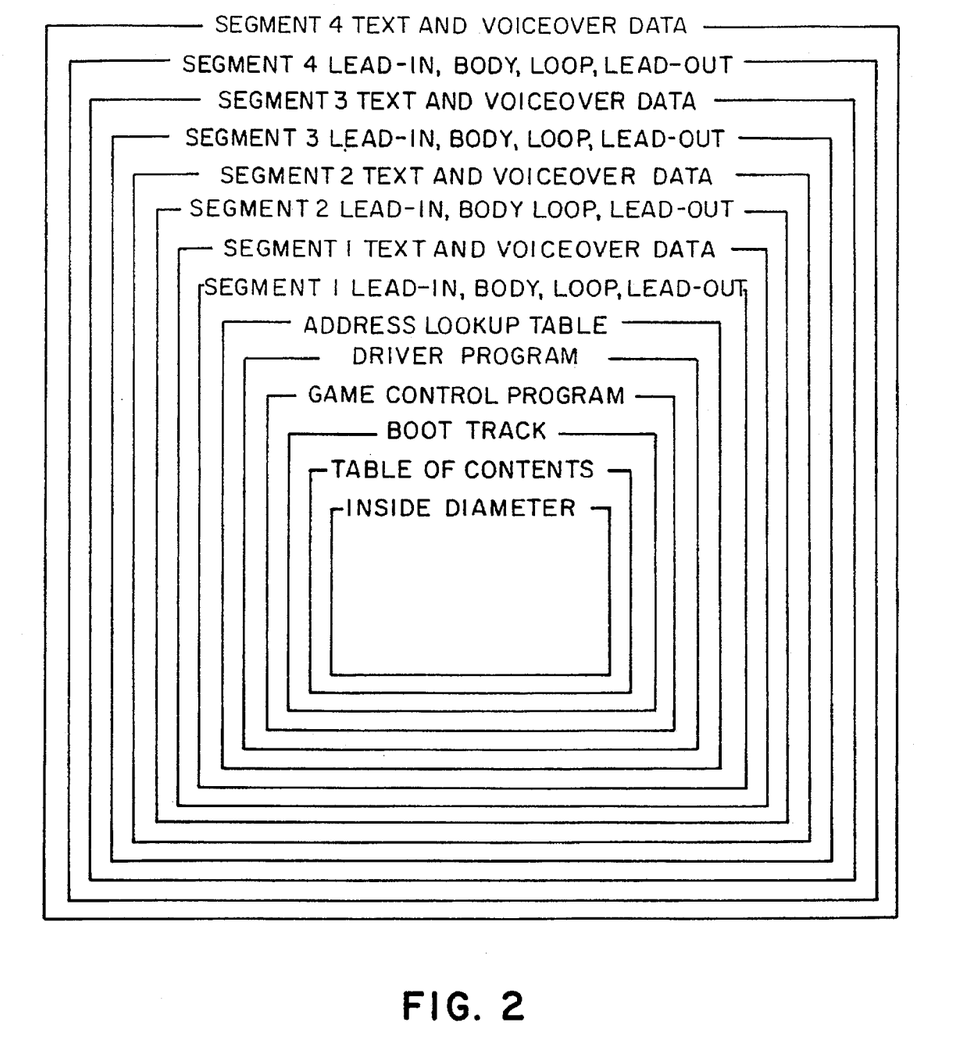
FIG. 2 is a diagram of the contents of the CD.

An interactive game embodying the invention is preferably stored on a conventional optical disc. The disc contains at least one data file, containing a number of video segments, a driver program that is loaded into main memory during start-up, and a game control program responsive to user input. The representation of the disc in FIG. 2 is an approximation. A CD comprises not concentric tracks, but actually a continuous spiral track.

The game control program and driver program are located in the boot track of the CD, so that they are encountered and loaded first. These programs occupy only a tiny fraction of the CD's space, most of which is filled with video, text and audio data arranged as a large number of "clips" each having a length of from several seconds to a few minutes. There may be a few hundred clips on the CD—more or less, depending on the average clip length and the data requirements per second, which in turn depend on factors like screen size in pixels, data compression ratio and the number of frames per second.

Memory allocation

Figure 3:
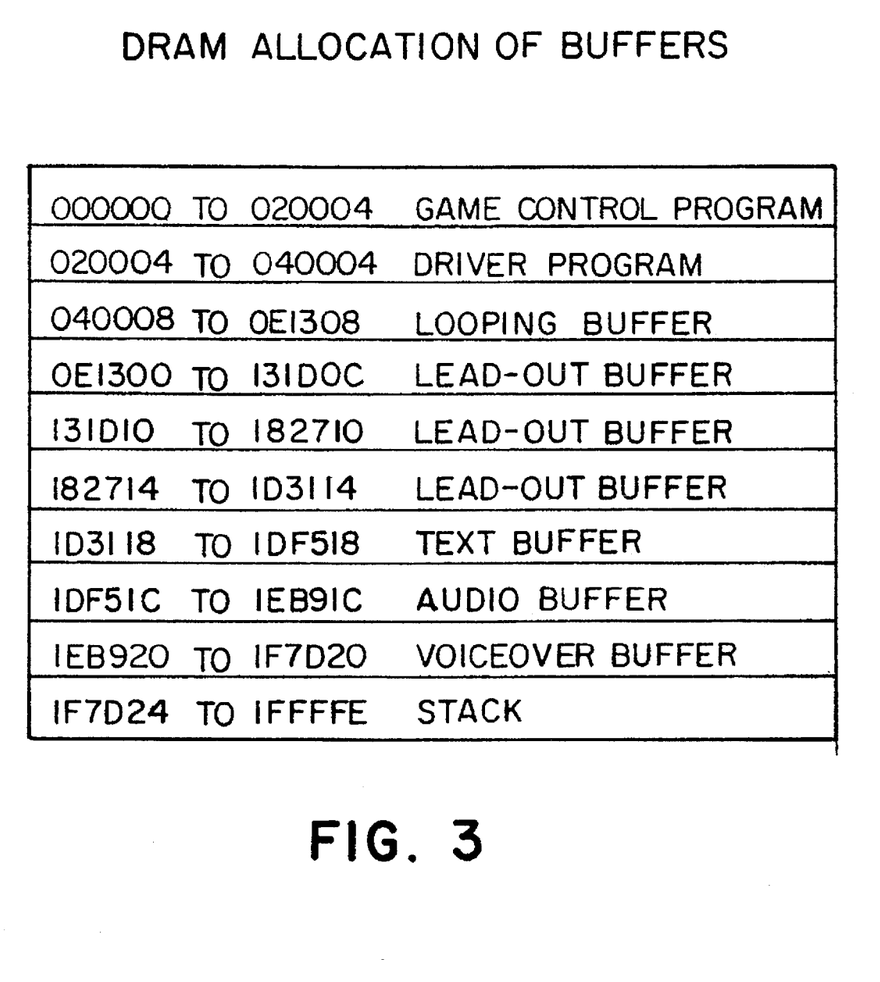
FIG. 3 shows DRAM buffer allocation.
Figure 4:
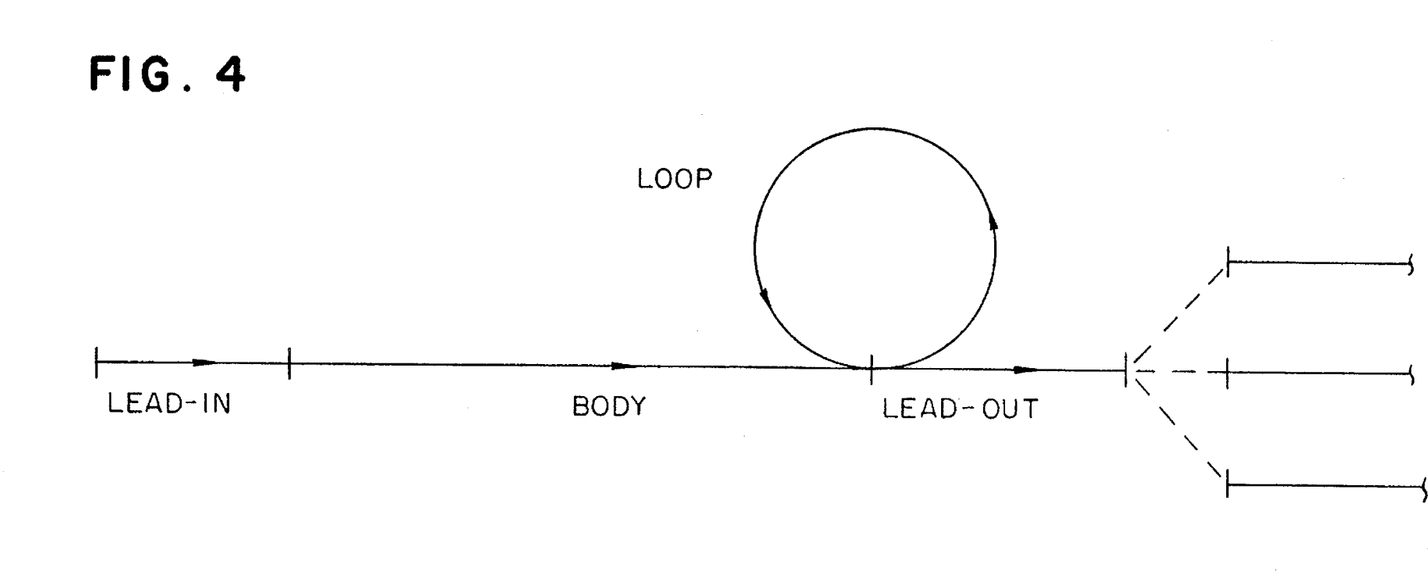
FIG. 4 is diagram of the film clip architecture.

As shown in FIG. 3, the system's free dynamic memory is partitioned by the game control program to provide for data buffering and buffer looping. For example, in the Atari Jaguar, the 2 MB of DRAM can be partitioned under software control into program and data memories. Of that, 256 KB of DRAM are allocated to program memory, split into two parts: one for the driver and one for the game control program. The remaining 1.75 MB are divided into 7 data buffers:
(1) a 660 KB buffer for looping,
(2) three lead-out buffers of 330 KB each,
(3) a soundtrack audio output buffer of 50 KB,
(4) a subtitle voiceover audio output buffer of 50 KB and
(5) a text buffer of 50 KB.

Each buffer is of the "circular" type. That is, once a buffer is filled from bottom to top, it is re-filled again from bottom to top, with new data overwriting the old data within the buffer. The read-out pointer into the buffer always stays ahead of the write-in pointer.

Data

As mentioned above, the invention displays a "film" which is spliced, as the game is played, from relatively short film "clips" that have been produced in compatible sets.

The film clip architecture is based on relatively short contiguous film clips that are filmed in matched sets. Each clip is a linear-time structure consisting of a lead-in segment, a body segment, a loop segment, and (optionally) a lead-out segment. "Matched" means that these four segments are designed and filmed so that they can be played back as a seamless unit and some of the parts can be re-used with other parts from different matched sets of four to create new seamless sets. To the player, the cuts between the four segments are either invisible or naturally occurring, as in a conventional movie in which the film makers have used multiple camera shots to construct a coherent scene.

In conventional film making, cuts are made purely for story-telling and aesthetic purposes. With this invention, however, consideration must be given to buffer sizes, buffer quantities, data transfer rate and data access times. Also, whereas conventional film sequences are typically viewed once or twice, always in the same sequence in which they were printed on the linear film, this invention may use the same lead-out or lead-in multiple times, with a different segment body and loop each time. Thus, multiple linear-time sequences may be constructed in a "mix and match" process from film segments, on-the-fly, during playback.

The architecture is defined by the following requirements:
1. Each film clip's lead-in, loop and lead-out segments are matched in terms of maximum length, i.e., the number of KB representing the data necessary to play back for an absolute time period, in units such as SMPTE timecode (i.e., hours:minutes:frames) with every other film clip in the game. This makes all film clip lead-ins, loops and lead-outs interchangeable in terms of buffer consumption, though story line and plot considerations necessarily limit the actual interchangeability of segments. (The game control program for each game contains a look-up table that specifies allowable matches.)
2. Within a film clip, the lead-in, body, loop and lead-out must match at the segment boundaries, so the film clip plays seamlessly across those boundaries.
3. Lead-outs may match, in terms of film story line and plot continuity, more than one lead-in, and lead-ins may match more than one clip body.

Driver

The driver program is the engine that delivers the data from the CD to memory on demand, and makes sure that fresh data is always available. The driver program contains and implements certain rules to insure data is delivered to DRAM main memory in a timely fashion so that continuous playback of video is maintained. These rules are:
1. Prioritize disc seeks and associated film clip lead-out loads so that the clip nearest the current position of the disc drive read back head is loaded first, then the next closest, etc.

2. When possible (i.e., time allowing) maintain a separate disc data target buffer and a screen display memory buffer. Double-buffering reduces screen "tearing" caused by extra memory bus cycles incurred when reading and writing are occurring within the same "page" of memory.
3. Maintain a 64 to 128 KB distance between the write pointer and the read pointer within any DRAM buffer that is being used both as a target for disc data coming off the drive and a source for video display data (screen memory) being written to the output device (TV). Crossing of the pointers would cause the output image to be corrupted.
4. Retry a missed or bad seek only once, then proceed to the next lead-out. Report the error as in the next item.
5. Set the "load not complete" flag whenever a new load command is received before the last lead-out of a set has been completely loaded, so the game control program will branch to the partial lead-out's remainder and body only if such a seek is physically possible. When such a seek is not possible, the game control program eliminates that branch from the film's "tree" at that particular node on that particular occasion. This action is concealed from the player.
6. When the game control program sets the "loop this buffer" flag, discontinue refilling of the buffer from disc, and instead, wrap the read pointer back to the beginning of the buffer and display the same data over again.
7. When the end of a file is encountered on the disc while reading data, skip ahead on the disc block by block, sector by sector, until the next file is encountered, and continue writing into the DRAM buffer, unless the game control program has issued a "stop" command.
8. Separate any text data from the disc data stream and write it into the text buffer. All the same rules on buffer handling described above for video data apply to text buffers as well.
9. Separate any subtitle audio voiceover data from the disc data stream and write it into the voiceover buffer. All the same rules on buffer handling described above for video data apply to voiceover buffers as well.

Game Control Program

The game control program performs four main functions:

(a) displaying a horizontally-scrolling subtitle beneath the video picture and/or audibly announcing the subtitle,
(b) scanning for player response to the key words in the subtitle,
(c) issuing commands to the disc driver, and
(d) maintaining a map of the protagonist's position in virtual space.

The virtual space of a film is a quasi-three dimensional space whose coordinates are Segment Number, Film Frame Number, and Hand. Each Segment Number corresponds to a part of a film clip, shot according to predetermined film making format rules. The principal rules are:

1. Within a film clip, all camera shots must begin or end on segment boundaries (at transition from lead-in to body, for example), except within the body segment.
2. The lengths (in time, expressed after conversion in KB) of a film clip lead-in, loop and lead-out must be the same or smaller than the DRAM buffers with which they will be associated in the finished game.

Since each film clip is filmed on a three dimensional stage or actual locale, the Segment Number indicates the start of a vector along a path in physical space. The Film Frame Number is that of the film frame last displayed within a Segment. "Hand" refers to right or left handedness, since the display screen can be swapped left for right, or vice versa in real time. (Switching left for right can be used to give the player the illusion that a corridor has both right hand turns and left hand turns, although it was filmed only one way). By maintaining a list of the player's previous positions during a game, the game control program "knows" where the player has been and what the player has viewed within each Segment up to the player's present position in the game. This path vector history may be used to play back the film as a continuous movie of the player's "moves" during a particular film experience, after the player has won or lost.

The following pseudocode fragment exemplifies the game control program's operation at a decision point at a looping segment in a game film. In this example, the software configuration is set to voiceover-only, fuzzifier on, and one-button control (A-Button).

EXAMPLE I

```
Setup:
get Decision A window (start_a, end_a)
get Decision B window (start-b, end_b)
start Looping Segment playback (buff_num)
start reaction timer (frames)
Check_window_a:
        get time (frame number)
        if time = start_a
        then
        Get_button_A:
                Button A pressed?
                        if true
                                set window=a
                                save reaction time (frames)
                                reset reaction timer
                                goto Check_window_b
                        else
                                get time (frame number)
                        if time=end_a
                                reset reaction timer
                                goto Check_window_b
                        else
                                goto Get_button_A
        else
                        goto Check_window_a
Check_window_b:
        get time (frame number)
        if time=start_b
```

```
                then
                Get_button_A:
                        Button A pressed?
                                if true
                                        set window = b
                                        save reaction time (frames)
                                        reset reaction timer
                                        goto Fuzzify
                                else
                                        get time (frame number)
                                if time=end_b
                                        goto Fuzzify
                                else
                                        goto Get_button_A
        else
                goto Check_window_b
Fuzzify:
get player status (mission score, speed rating, attitude)
get window (=0, a or b)
get reaction time (frames)
Check_continue:
        if window = 0
                then goto Loop_done
        else
                evaluate keyword
                update attitude (cumulative, last_keyword_value)
                evaluate speed (average, instantaneous)
                update mission score
                set new window durations (start_up_down,
                                keyword_values_up_down)
                sum weights from above, multiply by vectors
        if result<threshold
                then select fatal lead-out segment (segment_num)
                goto Loop_done
        if result>or=to threshold and window=a
                then select lead-out segment "a" (segment_num)
                goto Loop_done
        if result>or = to threshold and window = b
                then select lead-out segment "b" (segment_num)
                goto Loop_done
Loop_done:
        get time (frames)
        if time=end_of_loop
                then goto Proceed
        else goto Loop_done
Proceed:
        set driver display pointer to lead-out buffer
        set driver CD read pointer to next lead-in
        get start time (frames) of next looping segment
        save state space (last_segment_num, last_frame_num,hand)
Play_wait:
        if display pointer = loop_start
                then goto Setup
        else goto Play_wait
```

Player-machine interface

The player of the game receives information from the video display and system speaker(s). The video display contains both action scenes and a scrolling subtitle which conveys additional information. The speaker may provide not only background music and action sounds, but also verbal information in the form of a voiceover identical to and synchronous with the subtitles. The player sends instructions to the machine by way of the control pad or keyboard, in the form of simple keypresses.

Figure 5:
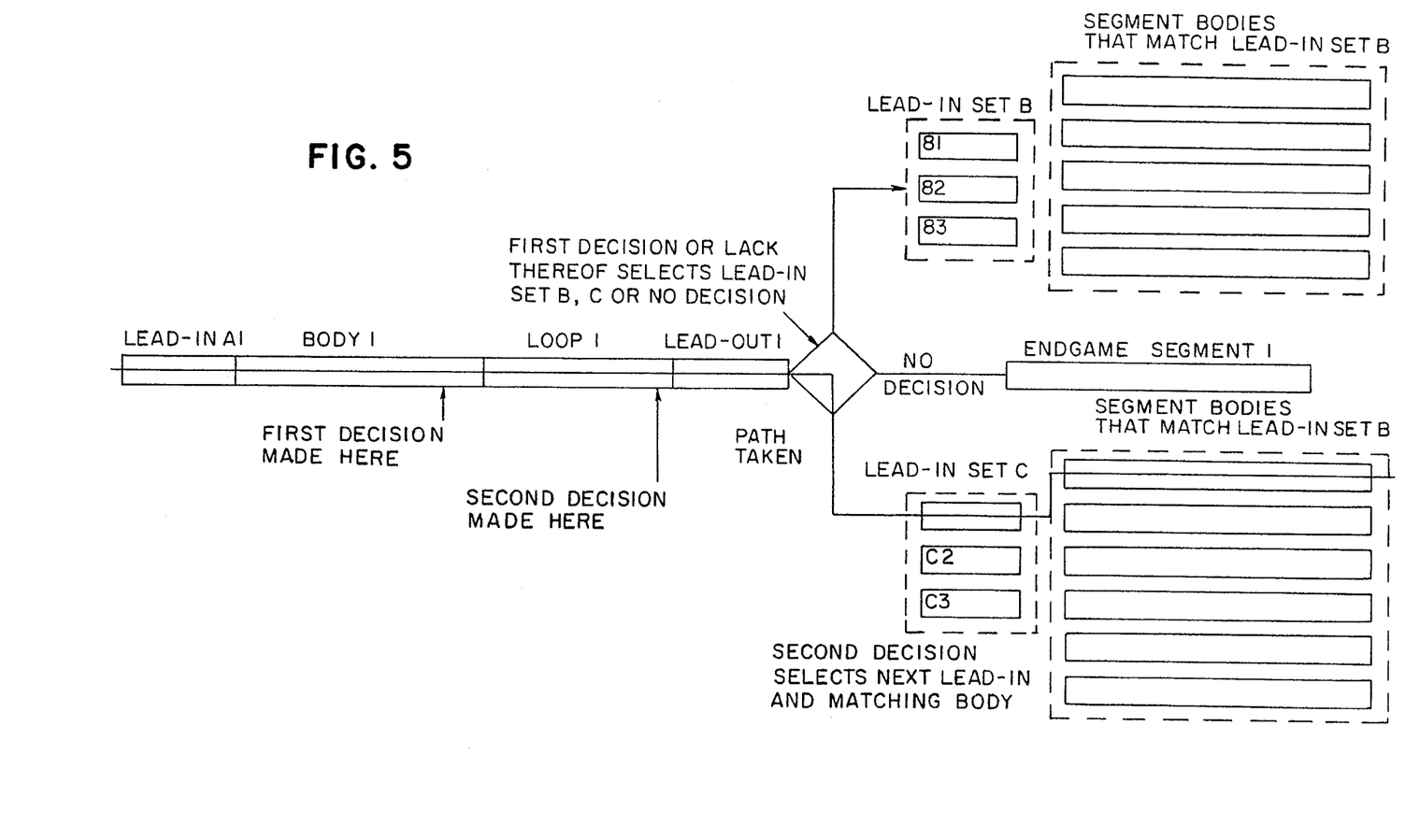
FIG. 5 illustrates how the lead-out of one film clip is matched to a plurality of lead-ins on other clips.

In most film clips, two decision opportunities are presented sequentially to the player, as shown in FIG. 5. The first decision is of a general nature, such as what type of action—e.g., flight or fight, the protagonist should take. The primary decision must be made while the main body of the segment is playing. The second decision, determining the specific action that will occur, such as hand-to-hand fighting vs. firearms, must be made while the film loop is playing. Failure to make any decision within a reasonable time may be taken by the control program to signify concession, whereupon an end game sequence is loaded and run. Alternatively, indecision may have non-fatal results, such as loss of score or a default choice.

Operation

In operation, after the user has inserted a disc in the CD ROM drive and turned on the power, the operating system spins up the CD, verifies it, loads the driver and game control programs from the CD to program memory, and then hands over control of the system to the game control program.

The game control program issues the first seek command to the driver, which finds the start of the film data on the CD and begins loading it into the looping buffer, which at this point is set not to loop, but to operate in a circular fashion; continuously reading fresh data. The driver begins displaying video data from the buffer almost immediately, and simultaneously passes audio data to the audio output buffer where the audio DSP can retrieve it, decode it, and send it to the audio DACs. Any text data in the disc data stream is separated and written to the text buffer. Any voiceover audio data is separated and written to the voiceover buffer.

Seek commands from the game control program to the disc driver program are either in the form of a "goto sector number" or "goto timecode", depending on the type of storage medium. In any case, the game control program contains a table of storage medium addresses that correspond to the start of stored data for film segment components, such as lead-ins, bodies, loops, etc., to facilitate the seek process.

Within a few seconds of the beginning of playback of the film, the first branch point, or node, is reached. The game control program anticipates this event, since it contains a table of all the nodes. The branch point always corresponds to a loopable segment of video and audio data.

As the loopable segment is loaded and displayed in real time by the driver, the game control program presents the user with two or more options for the film's continuation after the loopable segment. These options may be presented via subtitle, below the TV picture as in a foreign language film with English subtitles, by voiceover of key words, or by both subtitle and voiceover simultaneously.

Once the end of the loopable segment is reached, the game control program signals the driver to continue audio and video playback by repeating the DRAM loop buffer (the loop flag is set). Because the loop buffer has already been filled, the driver is free to seek out a set of lead-outs on the CD and load them into the three lead-out buffers while film playback continues from the DRAM loop buffer. By the time the loop buffer has played twice, three or more data buffers have been filled with alternative lead-outs.

Once the player makes a choice, the game control program chooses which lead-out data buffer to read from, in accordance with the decision just made by the player. Lack of a decision by the time the loop buffer has played a preset number of times, e.g., three, is taken as a "no-choice" by the game control program. When film playback reaches the end of the loop buffer for the second time, the user-selected branch is enabled or the no-choice default branch is taken.

As soon as the film has continued into the selected lead-out buffer, the game control program clears the loop flag (so the buffer will not loop anymore) and the driver takes two actions; all buffers except the selected lead-out are marked obsolete so their contents may be overwritten, and a seek is initiated to one of the lead-ins that matches up to the selected lead-out. Branching at this point is possible as well. By the time the film data in the lead-out DRAM buffer is consumed, the driver has found the lead-in of the next segment on the CD and begins writing that into the loop buffer and displaying it.

In summary, the looping buffer is used in a non-looping mode while the lead-in, and body of a film clip segment are played, then in a looping mode after one pass of the loop data has been played. Subsequent plays of data from the loop buffer serve to hide the loading of the lead-out buffers from the user, who perceives that the film is always continuously playing back in real time.

Optimizing performance

The relationship among data access time, buffer sizes, number of buffers, effective playback rate, lead-out segment length, and looping segment size can be defined mathematically so that the trade-offs among these variables can be optimized for specific hardware platforms and film titles. The expressions below are generalized so that they are applicable to any hardware platform or networked system. It should be obvious that the number of looping buffers can be increased and that the effective transfer rate from storage may be significantly higher that the data display rate, but for the sake of clarity, storage to memory and memory to display rates are assumed below to be equal and one looping buffer is assumed.

In the equations below:
E=Effective data transfer rate from storage to DRAM (in KB/sec)
$T_D$=Time to access data within a predefined region of storage (in seconds)
$B_{LP}$=Looping buffer size (KB)
$B_{LO}$=Lead-out buffer size (KB)
$B_A$=Audio buffer size (KB)
$B_V$=Voiceover buffer size (KB)
$B_S$=Subtitle text buffer size (KB)
$B_N$=Number of lead-out buffers (integer)
$S_{LP}$=Looping segment of film length (KB)
$S_{LO}$=Lead-out segment of film length (KB)
$M_T$=Total size of DRAM memory (KB)
$M_P$=Program plus program work space memory (KB)
The above variables are related as follows:

(1) $B_{LO}=S_{LO}, B_{LP}=S_{LP}$

Although film segment lead-ins and bodies may be any arbitrary length, lead-outs and loops must be matched to DRAM buffer sizes.

(2) $M_T=M_P+B_A+B_V+B_S+[B_N(B_{LO})]+B_{LP}$

The total amount of DRAM available is allocated per the above equation, not counting the effects of any operating system overhead.

(3) $E(T_D)=B_{LO}$

Thus, lead-out buffer size is determined by transfer rate and access time.

$$B_{LP} = E\left[\left(\frac{B_N B_{LO}}{E}\right) + B_N(T_D)\right] \quad (4)$$

The looping buffer size required to hide lead-out buffer loading when only one repeat play of the loop is allowed is shown above. If two repeat plays of the loop are allowed, the loop buffer, and the looping film segment itself may be halved.

Subtitling

In the presently preferred form of the game, a horizontally-scrolling subtitle is displayed beneath the picture, to assist the user in providing feedback to the program by pressing a button on the hand-held control. Commands are issued to the engine by the game control program in response to a player's decisions on behalf of the protagonist.

Subtitles are stored as ASCII text data interleaved with film segments on the storage device. Voiceover audio sample data is similarly stored in an interleaved fashion. These two types of data are buffered separately from the main film segment video and audio data, and are not locked in frame synchronization with the main data. The advantage to handling these two data sets synchronously and independently from one another is that there is no requirement that the game control program utilize either set, and multiple versions of the subtitles and voiceovers can be available in buffers for use as demanded by the game control program, depending on player input.

The player makes game decisions by depressing a button or key on his controller or keyboard when the desired keyword is displayed in the subtitle, or spoken. In the case of subtitle display, the selection must be made while the keyword is within a "window" (that is not visible to the player) of opportunity that may span any portion of the TV screen width, but most generally is centered at the bottom of the screen. The window may be as wide as the screen, or much narrower, depending on game difficulty. Where the keywords are only in voiceover form, the selection must be made within a preset time after the word is "spoken"; again, this time period may vary.

This time period is variable within a range appropriate to the type of decision to be made. The specific window length is varied by the game control program to increase or decrease the difficulty of the game. A short window, requiring the player to act quickly, would be appropriate to a fighting game where the player has to choose a type of punch. A long window is more appropriate to a mystery game where some thought about the significance of an on-screen clue is needed before a decision can be made. One can see in the code fragment above that the window length is recalculated at every game decision point, or node.

Suppose, for example, that the protagonist, Jack, must decide whether to kill a nurse, the game control program plays a voiceover consisting of two words "die!" and "enough!" out of the voiceover buffer, as if they were spoken by Jack to himself. If the player presses the button as the word "die!" is spoken, or scrolled to the center of the subtitle window below the picture, the game control program directs the driver to switch playback buffers to the "kill the nurse" lead-out segment immediately after the loop endpoint is reached. But if the player presses the button as the word "enough!" is spoken, the game control directs the driver to switch playback to the "quit choking the nurse" lead-out segment immediately after the loop endpoint is reached.

The game may have a learning mode, in which the keywords are displayed in colors different from the rest of the subtitle. When not in learning mode, the player must deduce or learn by experience which words are keywords, as other words in the subtitle cannot be selected.

Note that there is no mechanism for emphasizing keywords within voiceover data. The player must learn by failing repeatedly which words might be "hot". That is part of the game's difficulty when subtitles are turned off.

The opportunity to make a decision may be repeated a limited number of times (perhaps three), as the clip loops. The subtitle loops with the action display.

Both voiceover and subtitle keywords are assigned values by the game control programmer at the time the film is produced. The value scale is itself programmable, but for the sake of this discussion it ranges from 0 to 15, where 0 is a keyword with a very negative value, and 15 is a keyword with a very positive value. "Value" in this context is of a psychological type For example, "death" is a keyword with a value of 0. "Life" is a keyword with a value of 15, and "pause" has a value of 7. These values are passed to the fuzzifier, which weights the approaching decisional branches accordingly.

Figure 6:
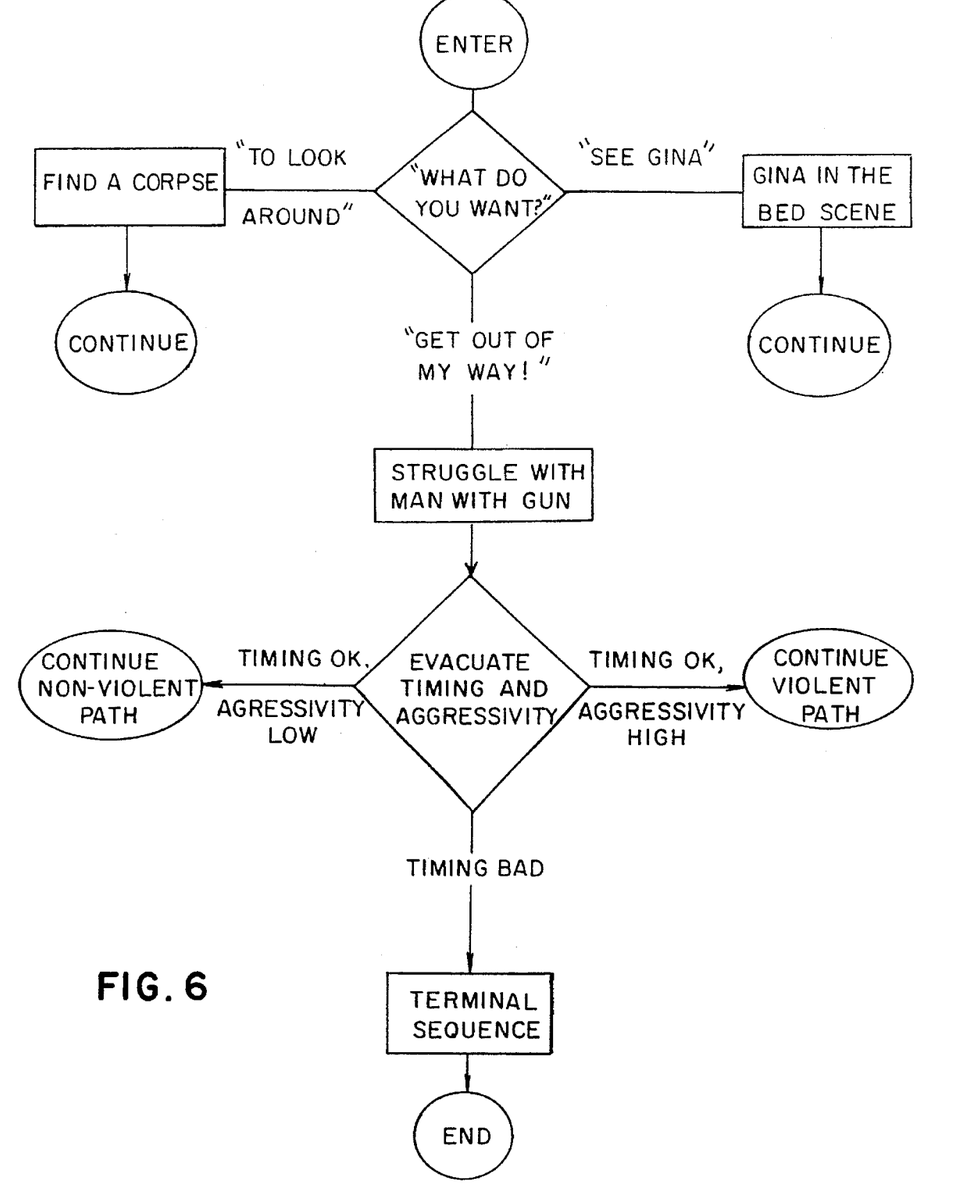
FIG. 6 diagrammatically shows decision branching in a hypothetical game fragment.

If the player does not press any button within the required time, the game control program will evaluate the player's status variables, including: attitude, based on previous decisions; score, based on timely performance at previous decision points; and the fuzzifier's output. Depending on the result of the evaluation: the player may be held in the loop a second or third time; he may be allowed to continue the film along a default branch; or a fatal scene outcome may be evoked, and the game terminated. The latter alternative is depicted in FIGS. 5 and 6, the latter figure being a flow chart illustrating the game choices and flow corresponding to the game fragment shown in FIG. 5.

Figure 7:
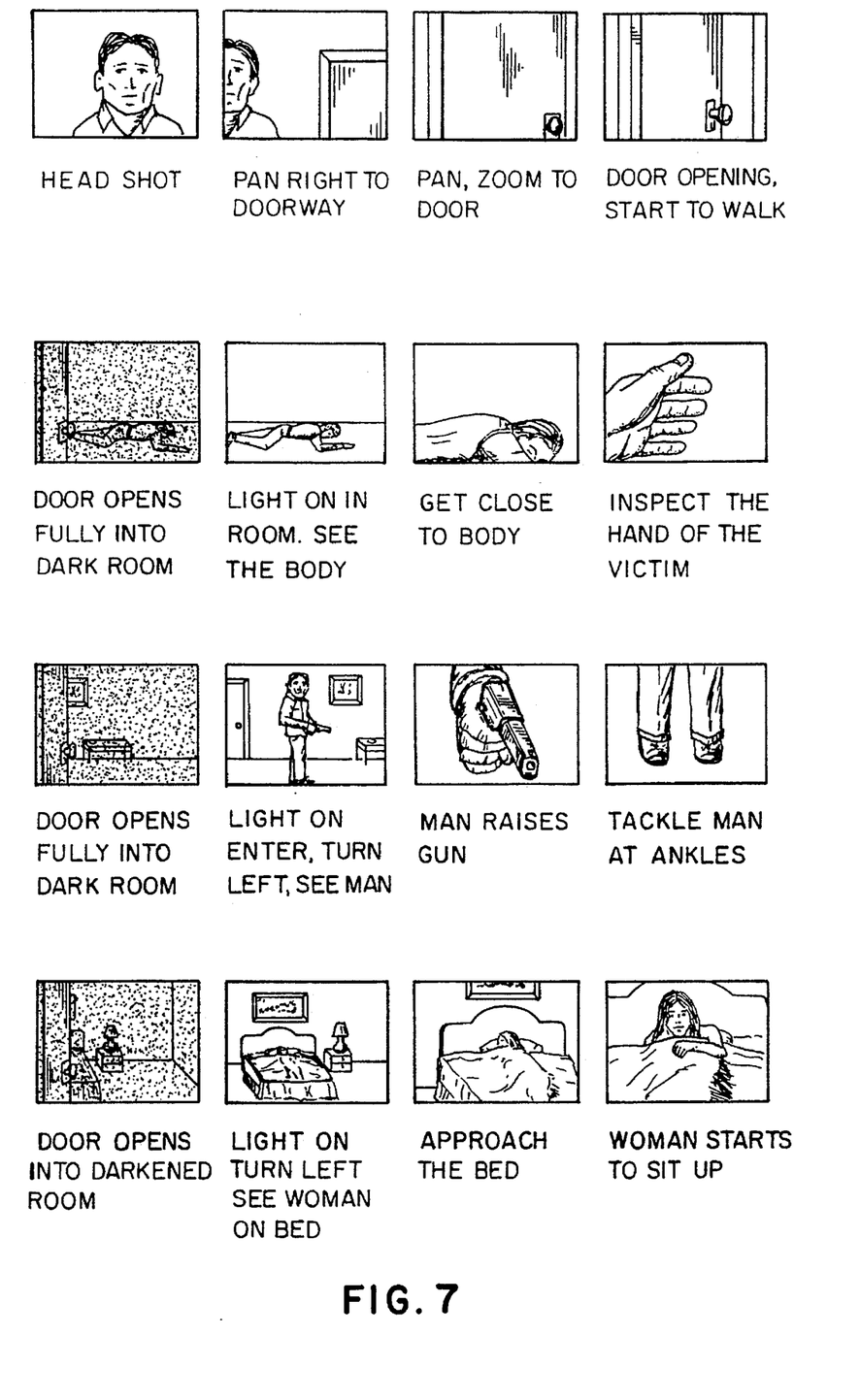
FIG. 7 shows a series of video displays from the hypothetical game.

FIG. 7 shows a lead-out from one scene (first row), and lead-ins for three alternative subsequent scenes, below. Four non-adjacent frames from each clip are drawn to illustrate the action. Note that, whichever branch is selected, the door opening at the end of the lead-out and the first frame of each lead-in form a plausible and seamless transition.

The data in the text buffer is used to index a look-up table that maps ASCII character data into bitmaps of alphanumeric figures. These bitmaps are concatenated into a larger bitmap in DRAM that corresponds to a linear image of the text string. The graphics chip is caused to pan (by incrementing memory addresses) across this linear binary image and the effect is to cause the bitmapped text to scroll horizontally, right to left, along the bottom edge of the TV screen.

Subtitles may be used not only to elicit decisions from the player, but also to assist him by providing helpful hints. As a variation, the subtitles may contain confusing or misleading information. For example, to misdirect the player into choosing to kill the nurse (wrong decision) in the scene described above, the subtitle scroll leading up to the decision point might read "I know she's part of the gang that mugged me last night . . .". The player, taking that as a hint, will most likely choose to kill the nurse, and lose the game.

Since the invention is subject to variations, it is intended that the foregoing description and the accompanying drawings shall be interpreted as illustrative of only one form of the invention defined by the following claims.

I claim:

1. An interactive video game film comprising a data storage medium containing:

data arranged in compatible segments representing video film clips, each segment comprising a body containing a non-repeating video sequence beginning with a lead-in, and a loop containing a repeatable video sequence, to provide a player time to make a game decision while the loop repeats, each loop being contiguous with the lead-ins of at least two different ones of said bodies;

a driver, useful with various different games, for transferring data from the storage disk to a video display, and a game control program, unique to a particular game, for providing an interface between the player and the driver, said game control program comprising means for advising the player of his options at approaching decision points during the game, and means responsive to instructions from the player, for selecting between said at least two different bodies while the respective loop is repeating, thereby controlling the order in which film segments are displayed on the screen during the game.

2. The invention of claim 1, wherein the advising means comprises means for displaying a subtitle on the display in synchronization with the video display, said subtitle containing key words which the player may select to make game control choices.

3. The invention of claim 2, wherein the advising means comprises means for audibly announcing the contents of the scrolling subtitle, in synchronization with the subtitle display.

4. The invention of claim 1, wherein the advising means comprises means for audibly narrating the game, said narration containing key words to which the player may respond to make game control choices.

5. A method of displaying an apparently continuous action film on a video display, and permitting a player to control the course of the action by selecting from plural alternatives at each of a plurality of decision points during the film, said method comprising steps of writing a number of compatible film clips into a storage medium as data elements or variable length, each clip having a body having a lead-in at its beginning, and a loop, and then, loading selected ones of said data segments into a random memory and generating a video display in response to the contents of the loaded data segments, said selection step being at least partially under the control of a player of the game, and generating repetitive action at said decision points by repeatedly displaying the content of at least one of said loops while waiting for player input.

6. The invention of claim 5, wherein the loop repeating step is continued only for a predetermined length of time, and a default decision is made for the player at the end of said time.

7. The invention of claim 5, wherein the loop repeating step is continued only for a predetermined length of time, and the game is terminated at the end of said time.

8. The invention of claim 6 or 7, wherein said length of time is determined as a function of decision difficulty and player skill.

9. The invention of claim 5, wherein player input is not absolutely determinative of the course of play at at least some of said decision points, where the decision reached is determined from the player's status variables, including attitude, based on previous decisions and ability or score, based on timely performance at previous decision points.

10. The invention of claim 9, wherein said decision is also based on branch weighting, and the decision involves some randomness.

* * * * *